June 23, 1925.
F. A. STREISEL
1,543,531
HOLDER FOR BREAD KNEADERS OR THE LIKE
Filed Nov. 14, 1924
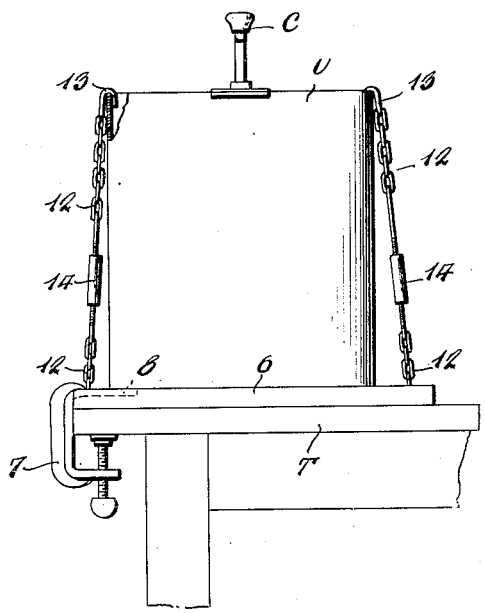
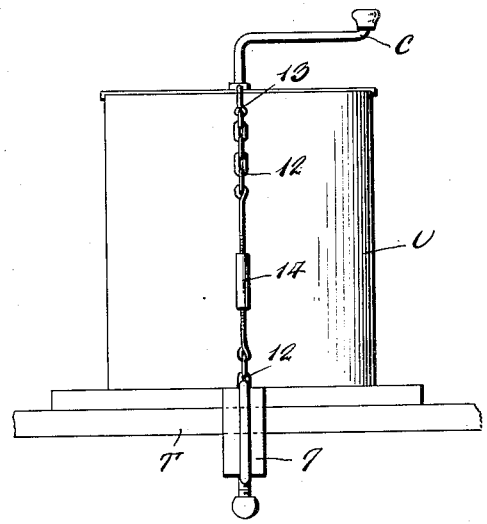
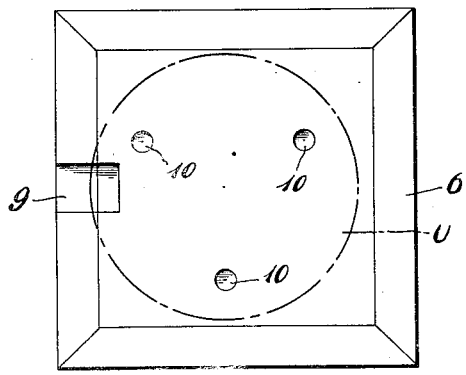
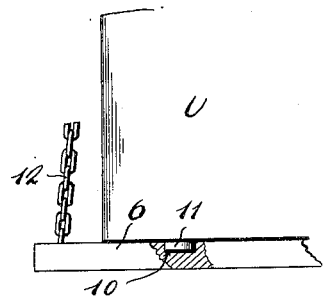
INVENTOR.
Fred A. Streisel
BY John A. Bommhardt
ATTORNEY.

Patented June 23, 1925.

1,543,531

UNITED STATES PATENT OFFICE.

FRED A. STREISEL, OF CLEVELAND, OHIO.

HOLDER FOR BREAD KNEADERS OR THE LIKE.

Application filed November 14, 1924. Serial No. 749,902.

*To all whom it may concern:*

Be it known that I, FRED A. STREISEL, a citizen of the United States, residing at Cleveland, in the county of Cuyahoga and State of Ohio, have invented certain new and useful Improvements in Holders for Bread Kneaders or the like, of which the following is a specification.

This invention is a holder for bread kneaders and similar utensils which are extremely difficult to hold during operation thereof.

The primary object is to provide a holder which may be readily arranged upon a table or the like support and so hold a bread kneader as to positively prevent the least movement with respect to a table or other support.

Another object is to provide a holder of this character which may be readily adjusted for use upon different types or sizes of bread kneaders or other similarly constructed utensils.

Other objects will be in part obvious and in part pointed out hereinafter.

In order that the invention and its mode of operation may be readily understood by persons skilled in the art, I have in the accompanying illustrative drawings, and in the following detailed description based thereon set out one possible embodiment of the same.

Figure 1 is a side elevation of a holder in operative position;

Figure 2 is a side elevation taken at right angles to the view shown in Figure 1;

Figure 3 is a plan view of the base of the holder, and

Figure 4 is a detail sectional view of the connection between the supporting base and a utensil.

In the accompanying drawings, throughout which, similar characters of reference designate similar parts my improved holder for bread kneaders and the like utensils is illustrated as comprising a flat base 6 preferably though not necessarily of rectangular formation and made up of one or more strips of wood. This base 6 is designed to be placed upon a table top T or the like support and securely clamped thereto by means of a wood clamp 7 which obviously may be of any ordinary or preferred construction. The upper leg 8 of the clamp 7 is quite long and necessarily extends beneath the utensil U being held by this device and in order to accommodate this leg I form a channel 9 as indicated in Figure 3 of the accompanying drawings, with the result that this leg 8 does not interfere with proper positioning of a utensil U.

The utensil U is arrangeable upon the upper face of the base 6 and in order to prevent relative shifting of the two elements I form in the upper face of said base, a set of three uniformly spaced recesses 10 which are of sufficient depth and diameter to snugly receive legs 11 which are formed upon the base of the utensil. The result is that these legs 11 will fit into the recesses 10 and positively prevent relative lateral shifting.

It is now only necessary to prevent tilting or vertical movement of the utensil U and in order to attain this I provide at diametrically opposite points flexible elements such as chains 12 whose upper ends are provided with hooks or the like 13 adapted to take over the upper rim or top of the utensil as clearly shown in the drawing. The lower end of one chain 12 is secured to the upper arm 8 of the clamp 7 while the lower end of the other chain is secured to the base 6 at a point substantially diametrically opposite said arm 8. Turn buckles 14 may be arranged between the ends of the chains and employed to vary the length of the chains to accommodate different sized utensils as is quite obvious.

In view of the above specified structure it is quite clear that with positioning of a utensil with its legs in the recesses 10 and properly arranging the chains 12 as stated, the crank C of the utensil may be rotated at will without in the least changing the position of the utensil with respect to the table or other support.

Without a holder of this type it is extremely difficult to operate a bread kneader or the like utensil due to continual shifting of the utensil from one place to another. As stated, this holder entirely prevents any such shifting.

Certain minor changes in the details of construction may be resorted to and such of these changes as may fall within the scope of the appended claims I consider within the spirit of my invention.

I claim:

1. A receptacle holder comprising, a base member having leg receiving sockets, a clamp for securing the base member to a support, adjustable flexible non-resilient elements carried by the clamp and base member, and hooks carried by the free ends of said flexible elements.

2. A receptacle holder comprising, a base member having leg receiving sockets, a clamp for securing the base member to a support, adjustable chains having one end connected to said clamp and base member, and rigid hook members fixed to the other end of the chains.

3. A receptacle holder comprising, a flat base member having leg receiving sockets in its upper face, said base member having a channel in its upper face opening through one edge, a U-shaped clamp arranged to interconnect the base member and a support and having one portion disposed in said channel, chains secured at one end to the clamp and base member, turn buckles for varying the length of the chain, and hooks carried by the free ends of said chains.

In testimony whereof, I affix my signature.

FRED A. STREISEL.